(12) United States Patent
Nakamura

(10) Patent No.: US 9,002,141 B2
(45) Date of Patent: Apr. 7, 2015

(54) IMAGE COMBINING DEVICE, IMAGE COMBINING METHOD AND PROGRAM TO IMPLEMENT IMAGE COMBINING METHOD

(71) Applicant: Nidec Sankyo Corporation, Nagano (JP)

(72) Inventor: Hiroshi Nakamura, Nagano (JP)

(73) Assignee: Nidec Sankyo Corporation (JP)

( * ) Notice: Subject to any disclaimer, the term of this patent is extended or adjusted under 35 U.S.C. 154(b) by 2 days.

(21) Appl. No.: 14/044,332

(22) Filed: Oct. 2, 2013

(65) Prior Publication Data

US 2014/0099044 A1 Apr. 10, 2014

(30) Foreign Application Priority Data

Oct. 2, 2012 (JP) ................................ 2012-220215

(51) Int. Cl.
*G06K 9/36* (2006.01)
*G06T 11/00* (2006.01)

(52) U.S. Cl.
CPC ....................................... *G06T 11/00* (2013.01)

(58) Field of Classification Search
USPC ............. 382/284, 282, 278, 290; 340/870.02; 345/158, 173, 619, 684; 235/494; 348/160, 218.1, 219.1; 355/25; 358/474, 448, 452, 537, 1.9, 3.27, 488, 358/1.15, 1.13; 705/412
See application file for complete search history.

(56) References Cited

U.S. PATENT DOCUMENTS

| | | | | |
|---|---|---|---|---|
| 7,092,132 | B2 * | 8/2006 | Matsuda | 358/474 |
| 8,174,737 | B2 * | 5/2012 | Kato et al. | 358/474 |
| 8,284,463 | B2 * | 10/2012 | Kato et al. | 358/488 |
| 8,289,593 | B2 * | 10/2012 | Sugahara et al. | 358/537 |

FOREIGN PATENT DOCUMENTS

JP 2006119730 A 5/2006

* cited by examiner

*Primary Examiner* — Anh Do
(74) *Attorney, Agent, or Firm* — Cantor Colburn LLP

(57) ABSTRACT

An image combining device may include an image reading unit that reads an image of a first and second partial area which have a portion overlapping; a template area setting section that sets apart an area of a predetermined shape as a comparison area from the overlapping area; a calculation area setting section that selects areas of the shape corresponding to the shape of the comparison area; a correlation coefficient calculating section that calculates a correlation coefficient between each of the image data values of the multiple areas; an area identifying section that identifies, from the multiple areas, the area in which the calculation result satisfies a predetermined condition; and a combining section that combines the images of the first and second partial areas in the positional relationship in which the area identified by the area identifying section and the comparison area overlap with each other.

5 Claims, 8 Drawing Sheets

IMAGE COMBINING DEVICE, IMAGE COMBINING METHOD AND PROGRAM TO IMPLEMENT IMAGE COMBINING METHOD

CROSS REFERENCE TO RELATED APPLICATIONS

The present invention claims priority under 35 U.S.C. §119 to Japanese Application No. 2012-220215 filed Oct. 2, 2012, the entire content of which is incorporated herein by reference.

FIELD OF INVENTION

The present invention relates to an image combining device, an image combining method and a program to implement an image combining method.

TECHNICAL BACKGROUND

In recent years, applications for user authentication by an ID card such as a driver's license or a basic resident registration card have been widespread. For such authentication, a method is typically carried out such that an ID card is scanned to acquire its digital image, the information on the front face thereof is automatically read by image recognition, and based on the information a user is authenticated. Also, cards with increased security with recorded fine patterns or characters on the card surface have become widespread in recent years, and an image scanner product that is equipped with a function to automatically recognize such a card and compare it to a high resolution color image have been introduced.

In such an image recognition system, a medium is divided into partial portions for multiple scanning in order to perform image recognition on a medium which has a large capacity exceeding the ability of the imaging device or [the capacity of] the image memory, and then those partial images are combined with each other afterwards to re-produce the whole image. As an example of such a technique for combining multiple [partial] images, Patent reference 1 has proposed a technique in which a spatial frequency is acquired by using discrete cosine transform (DCT) over the combining portions of the images, and the width of the combining portion is varied according to the size of the spatial frequency to implement the image-combining with fewer errors.

PRIOR ART REFERENCE

Patent Reference

[Patent reference 1] Japanese Published Unexamined Patent Application 2006-119730

However, the calculation of spatial frequency by using discrete cosine transform (DCT) requires a heavy calculation load; therefore, an operation device of high performance needs to be used, which accordingly increases cost.

SUMMARY

Therefore, at least an embodiment of the present invention is devised considering the above-described background, and it provides an image combining device that can minimize the processing workload in the image combining process, an image combining method and a program to implement the image combining method.

To achieve the above, at least an embodiment of the present invention provides an image combining device comprising an image reading unit which reads the image of a first partial area contained in a whole image to be read and the image of a second partial area image, part of which overlaps with a part of the first partial area, a template area setting section which sets apart an area of a predetermined shape from the overlapping area of the second partial area read by the image reading unit, which overlaps with the first partial area, as a comparison area, a calculation area setting section which selects areas of the shape corresponding to the shape of the comparison area, a correlation coefficient calculating section which calculates a correlation coefficient between each of the image data values of the multiple areas, selected by the calculation area setting section, and the image data value of the comparison area, an area identifying section which, from the multiple areas selected by the calculation area setting section, identifies the area in which the calculation result by the correlation coefficient calculating section satisfies a predetermined condition, and a combining section which combines the partial images by overlapping the image of the first partial area with the image of the second partial area in the positional relationship where the area identified by the area identifying section overlaps with the comparison area. According to this device, the processing workload during the image combining process is minimized.

In at least an embodiment of the present invention, it is preferred that, when the calculation result does not satisfy the predetermined condition, the correlation coefficient calculating section modify the size, the shape and/or the position of the comparison area which is set apart by the template area setting section and re-implement the calculation process using the modified comparison area. According to this device, when the calculation result by the calculating section does not satisfy the predetermined condition, the comparison area is modified and then the correlation coefficient is re-calculated; therefore, accuracy of the [image-]combining is kept from being deteriorated.

In at least an embodiment of the present invention, it is preferred that the area identifying section may identify the area having the largest value of the correlation coefficient which is calculated at the correlation coefficient calculating section, from the multiple areas selected by the calculation area setting section. According to this device, accuracy of the image-combining during the image combining process can be increased.

Also, at least an embodiment of the present invention provides an image combining method implemented by a computer which has an image reading unit for reading a first partial area image of a whole image to be read, and a second partial area image, which partially overlaps with the first partial area, comprising a template area setting step in which an area of a predetermined shape is set apart from the overlapping area of the second partial area, which overlaps with the first partial area, as a comparison area, a calculation area setting step in which the areas of the shape corresponding to the shape of the comparison area are selected, a correlation coefficient calculating step in which a correlation coefficient is calculated between each of the image data values of the multiple areas, selected by the calculation area setting section, and the image data value of the comparison area, an area identifying step in which the area, in which the calculation result by the correlation coefficient calculating section satisfies the predetermined condition, is identified from the multiple areas selected by the calculation area setting section, and a combining step in which the partial images are combined by overlapping the image of the first partial area with the image of the second partial area in the positional relationship where the area identified by the area identifying section overlaps with the comparison area. According to this method, a processing workload during the image combining process can be minimized.

Also, at least an embodiment of the present invention provides a program to make a computer, which is equipped with an image reading unit for reading the image of the first partial area in the whole image to be read and the image of the second partial area, function as a template area setting section that sets apart an area of a predetermined shape as a comparison area from the overlapping area of the second partial area which overlaps with the first partial area, a calculation area setting section that selects the areas of the shape corresponding to the shape of the comparison area from the multiple positions in the first partial area, a correlation coefficient calculating section that calculates a correlation coefficient between each of the image data values of the multiple areas selected by the calculation area setting section and the image data value of said comparison area, an area identifying section that identifies the area in which the calculation result of the correlation coefficient calculating section satisfies the predetermined condition, from the multiple areas selected by said calculation area setting section, and a combining section that combines the image of said partial area and the image of said second partial area in the positional relationship in which the area identified by the area identifying section and the comparison area overlap with each other.

According to at least an embodiment of the present invention, the processing workload during the image combining process can be minimized.

BRIEF DESCRIPTION OF THE DRAWING

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Embodiments

Configuration

Figure 1:
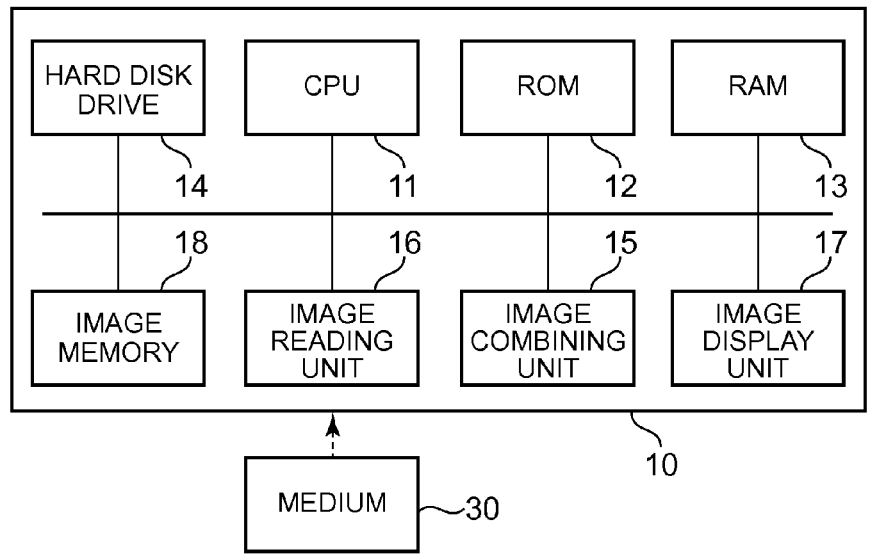
FIG. 1 is a block diagram of the entire configuration of an image combining device of an embodiment.

An embodiment of the present invention is described hereinafter referring to the drawings. FIG. 1 is a block diagram of the entire configuration of an image combining device 10 of an embodiment of the present invention. The image combining device 10 is a computer which is equipped with a CPU (Central Processing Unit) 11, a ROM (Read-Only Memory) 12 and a RAM (Random Access Memory) 13 as memory, a hard disk drive 14 which is a non-volatile large capacity storage means, an image combining unit 15, an image reading unit 16, an image display unit 17, and an image memory 18. The CPU 11 executes a program stored in the ROM 12 or the hard disk drive 14 using the RAM 13 as a work area.

The image reading unit 16 performs an image-reading on a medium 30 such as an ID card. The image reading unit 16 has a close-contact 1D imaging device (code 161 in FIG. 2) and a medium transport mechanism (no illustration). The medium transport mechanism is capable of moving back and forth, and the medium 30 is transported back and forth along the transport guide of the medium transport mechanism. Further, although not illustrated, a drive source such as a motor is provided to the medium transport mechanism. In the motor or the like, a publicly-known encoder is provided to detect the rotational position of the motor. Also, on the transport passage, sensors are arranged at multiple locations for detecting the position of the medium 30.

Also, the image reading unit 16 has an insertion opening (no illustration) through which the medium 30 is inserted thereto; the medium 30 inserted by a user into the image reading unit 16 is transported along the transport guide of the medium transport mechanism; as the medium 30 passes the imaging device, the image thereof is photoelectrically transferred after scan, line by line; after A (analog)/D (digital) conversion, the grayscale value of every pixel is taken into the image memory 18. In this manner, the pixel value of each pixel contained in the scanned image is stored in the image memory 18. The image combining unit 15 is equipped with a DSP (Digital Signal Processor) to implement an image combining process under the control of the CPU 11.

The image display unit 17 is a display means having a liquid crystal panel and a liquid crystal drive circuit, for example. The image display 17 displays various types of images according to the order from the CPU 11.

Figure 2:
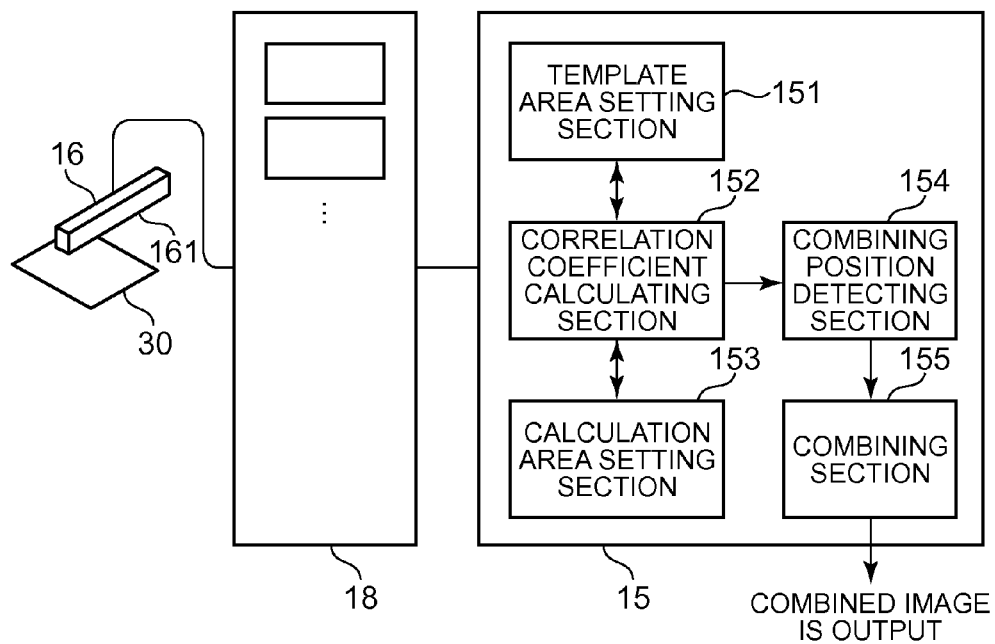
FIG. 2 is a block diagram of an example of a functional configuration of an image combining unit.

FIG. 2 is a block diagram showing an example of the functional configuration of the image combining unit 15. In the image memory 18, the first image data produced by reading the image of the first partial area of the [whole] image to be read and the second image data produced by the image reading unit 16 reading the image of the second partial area which partially overlaps with the first partial area, are stored.

A template area setting section 151 selects an area of a predetermined shape from the area in the second partial area which overlaps with the first partial area, and sets apart the selected area as a comparison area (a template area).

A calculation area setting section 153 selects, from the multiple locations in the first partial area, areas of the shape corresponding to the shape of the comparison area.

A correlation coefficient calculating section 152 calculates a correlation coefficient between the image of each of the areas selected by the calculation area setting section 153 and the image of the template area set apart by the template area setting section 151.

A combining position detecting section 154 identifies, from the multiple areas selected by the calculation area setting section 153, the area in which the calculation result from the correlation coefficient calculation section 152 satisfies the predetermined condition.

The combining position detecting section 154 corresponds to the area identifying section disclosed in at least an embodiment of the present invention.

A combining section 155 combines the image of the first partial area and the image of the second partial area in the positional relationship in which the area identified by the combining position detecting unit 154 overlaps with the comparison area.

[Operation]

Next, the operation of this embodiment is described referring to the drawings.

Figure 3:
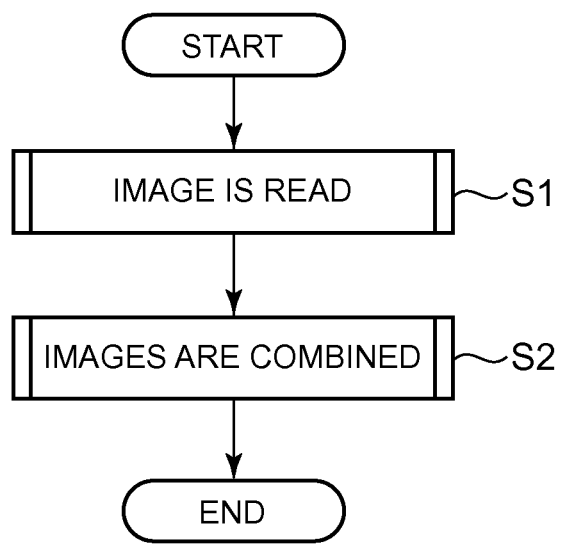
FIG. 3 is a flowchart of steps in the process implemented by the image combining device.

FIG. 3 is a flowchart of the steps in the process implemented by the image combining device 10.

This process starts as the medium 30 is inserted into the image reading unit 16.

First, the image reading unit 16 controlled by the CPU 11 reads the image of the medium 30 (Step 1). At that time, the image reading unit 16 reads the whole image of the medium 30 by making two partial readings. The image is divided in two partial images for reading because the image memory 18 in the data processing device does not have sufficient capacity to store the pixel values of all the pixels contained in the image of the medium 30 all at once. In this embodiment, the medium 30 is transported at a predetermined speed along the transport guide using the medium transport mechanism. The image of the transported medium 30 is read by the image reading unit 16; the (multi-valued) image data is stored in the first area of the image memory 18. However, the size of (the image of) the medium 30 exceeds the capacity of the first area in the image memory 18; therefore, the motor is stopped in the position at which the medium 30 in transporting passed the border of the first area, and the rotational position thereof is saved. Then, the rotation of the motor is reversed temporarily to return the medium 30 to the initial position. Next, the setting is changed to the area stored in the second area of the image memory 18, the motor is rotated, and the medium 30 is transported forward again. While the medium 30 is being transported, the image reading unit 16 is controlled so that it won't start taking the image in before the position at which the motor has stopped, that is the position at which the medium 30 has passed the border of the first area. The image reading unit 16 starts reading the image at the position before the motor has stopped (about ⅓ of the entire image, for example).

Figure 4A:
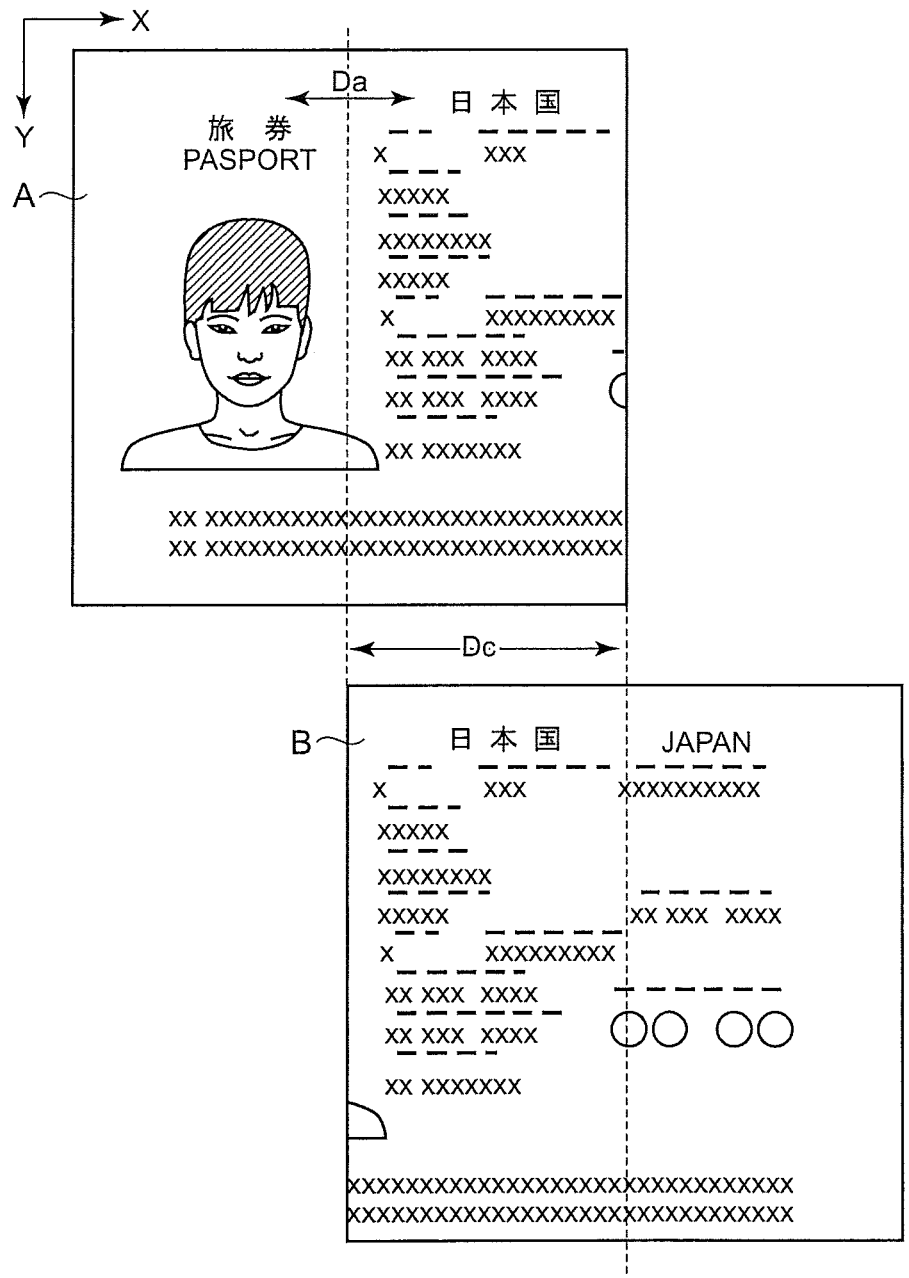
FIGS. 4A and 4B show the example of an image which is read by the image reading unit.

FIG. 4(a) shows an example of the images which are read by the image reading unit 16. In FIG. 4(a), the image A on the upper left side is the image taken by the first image scan; the image B on the lower right side is the image taken by the second image scan. The image reading unit 16 forwards the first image data representing the scanned left-side image A from the image memory 18 to the first image data holding section (no illustration) provided in the hard disk drive 14, and also forwards the second image data representing the scanned right-side image B from the image memory 18 to the second image data holding section (no illustration) provided in the hard disk 14.

As shown in FIG. 4, the two scanned images are taken in such that they have a common overlapping portion indicated by the width Dc which is composed of multiple pixels.

The overlapping portion is the portion in which the left-side image A and the right-side image B overlaps with each other.

In this embodiment, the area to be overlapped is predetermined, and accordingly the X coordinate corresponding to the reading start position (the reading start line) for the second reading is predetermined so as to include the overlapping area.

In the example shown in FIG. 4(a), the starting position for the second reading is the position one-third from the left edge, and the X coordinate indicating this position is stored in the hard disk drive 14 or the ROM 12 in advance.

The image reading unit 16 reads the image of the two-thirds of the entire area of the image of an identification proof such as an ID card from the left edge while moving the imaging device 161 to produce the first partial image data, and then moves the imaging device 161 by one-third of the entire length from the left edge and starts reading the area from that position to the right edge to produce the second partial image data.

In other words, the middle section which is one third of the entire area is the overlapping portion over which the first partial image data and the second partial image data overlap with each other.

The overlapping area is part of both partial image data readings so that the correlation coefficient operation is implemented on the overlapping area to identify the [image-]combining position more precisely.

The image combining unit 15 of the image combining device 10 combines the first partial image data and the second partial image data by an image-combining process which is described later, and various kinds of image analysis processes are implemented using the combined image.

When the image of the medium 30 is read twice in two sections by the image reading unit 16, the image combining unit 15 combines the left-side image A and the right-side image B together (Step S2). Next, the CPU 11 performs an image recognition using a technique called an OCR (Optical Character Recognition) on the combined image for various processes.

More specifically described, for example, the read image may be used for various kinds of authentication processes or a user registration process.

Figure 5:
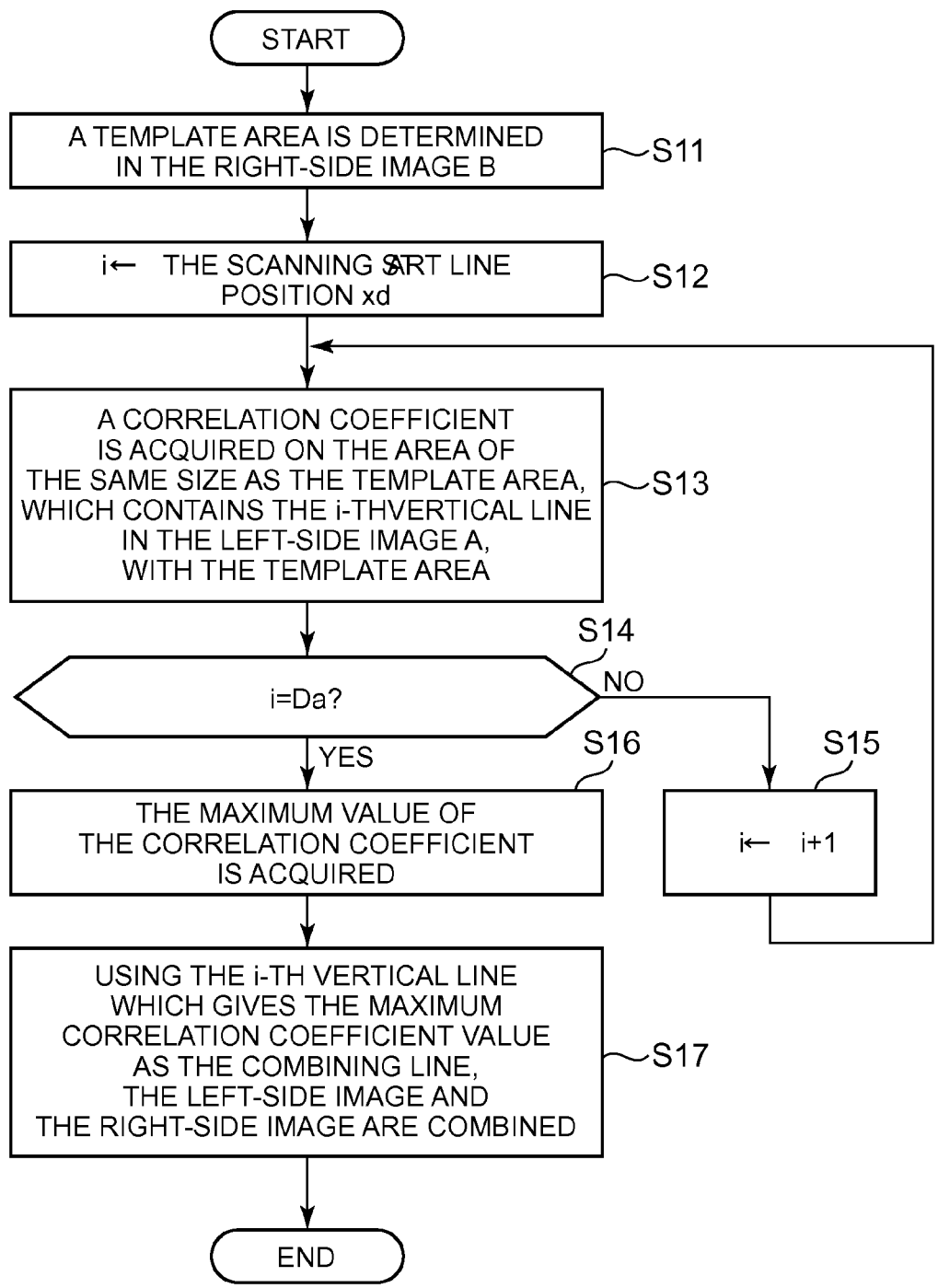
FIG. 5 is a flowchart of steps in a process implemented by the image combining unit.

Next, the image combining process mentioned in Step 2 in FIG. 3 is described referring to the flow chart shown in FIG. 5.

The image combining unit 15 implements a correlation operation to determine the combining position using the right-side image A and left-side image B.

First, the image combining unit 15 acquires the first image data from the image memory 18 and also the second image data from the image memory 18.

Next, the template area setting section 151 determines a template area T from the right-side image B representing the acquired second image (Step S11)

The template area T is the area which is a subject to the correlation operation to determine the combining position between the right-side image A and the left-side image B.

The template area has the width composed of multiple pixels in the X-direction (referring to FIG. 4) and has the same width in the Y-direction as the width in the Y-direction of the first image data or the second image data.

Figure 4B:
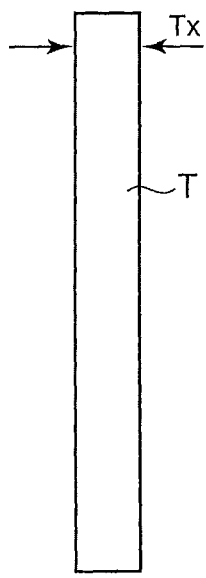

FIG. 4(b) shows an example of the template area T. In this embodiment, a rectangular shape is used for the template area T.

The horizontal width Tx of the template area T is set such that the condition, Tx<Dc, is satisfied within the range of the width Dc which is the common area of both images, and the setting is stored in the hard disk drive 14 or the ROM in advance.

Next, the correlation operation calculating section 152 searches the area of the same size that matches best with the template area T in the image representing the acquired first image data.

More specifically described, in this embodiment, the calculation area setting section 153 implements the process of Step S12 to select areas of the shape corresponding to the shape of the template area as the calculation area from the left-side image A, and the correlation calculating section 152 implements the process from Step S13 to Step S15 to calculate the correlation coefficients between the images of the areas selected by the calculation area setting section 153 and the image of the comparison area.

The calculation process uses the pixel value of every pixel contained in the images of the selected multiple areas and in the image of the comparison area.

The calculation area setting section 153 first determines the scanning start line i on the position xd which is outside the common area of the both images and close to the common area, and the area Si in which the line i is included and the width thereof is equal to Tx, as the calculation area (Step S12).

The scanning start line position xd is a predetermined value.

Next, the correlation coefficient calculating section 152 calculates the correlation coefficient between the area Si and the template area T. In other words, the correlation coefficient calculating section 152 acquires the correlation coefficient $r_i$ of the area Si of an equal size as the template area T that contains the i-$^{th}$ vertical line in the left-side image A, with the template area T by using the following formula (1), for example (Step S13). Note that, in the following formula (1), $x_j$ ($1 \le j \le n$) represents the pixel value of every pixel contained in the area Si, and $y_j$ ($1 \le j \le n$) represents the pixel value of every pixel contained in the template area T.

[Formula 1]

$$r_i = \frac{\sum_{j=1}^{n}(x_j - \bar{x})(y_j - \bar{y})}{\sqrt{\sum_{j=1}^{n}(x_j - \bar{x})^2}\sqrt{\sum_{j=1}^{n}(y_j - \bar{y})^2}} \quad (1)$$

Note that $\bar{x}$, $\bar{y}$ are the arithmetic mean of each data $x = \{x_j\}$, $y = \{y_j\}$.

Next, the correlation coefficient calculating section 152 judges whether or not the line i is the predetermined value Da (Step S14); when the line i is Da (Step S14; YES), the correlation coefficient calculating section 152 proceeds to the process of Step 16 and beyond; on the other hand, when the line i is not Da (Step S14; NO), the correlation coefficient calculating step 152 increments the line i (Step S15) and returns the process to Step S13 to re-calculate the correlation coefficient with the incremented line i.

In other words, when the line i is not Da in Step S14, the correlation coefficient calculating section 152 sets the area Si containing this line and having the width equal to Tx in the position which is shifted to the right by one pixel, and calculates a correlation coefficient between Si and Tx.

This scan is repeated a predetermined number of times (until the value of the line i equals Da).

By repeating the process from Step S13 to Step S15 until the value of the line i equals Da, the correlation coefficient is calculated between the each of the multiple areas contained in the left-side image A and the template area contained in the right-side image B.

Figure 6:
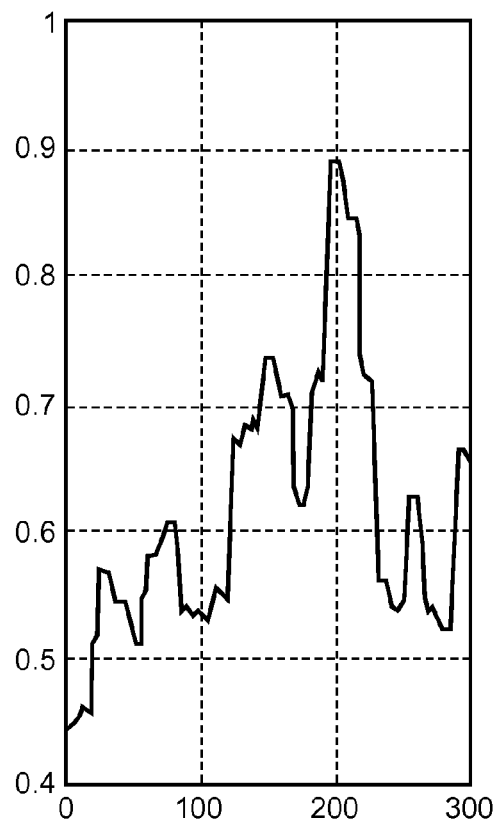
FIG. 6 is a graph showing an example of the calculated correlation coefficients.

FIG. 6 shows one example of the calculated correlation coefficients. In the figure, the horizontal axis indicates the X-coordinate in the left-side image A and the vertical axis indicates the value of the correlation coefficient.

Once the correlation coefficient is calculated on each of the multiple areas, the combining position detecting section 154 identifies the area in which the correlation coefficient thereof satisfies the predetermined condition, from the multiple areas.

Here, the combining position detecting section 154 searches for the maximum correlation coefficient (Step S16) to identify the line i with which the correlation coefficient is the maximum.

More specifically described, when the correlation coefficient calculation result is the one shown in the example by FIG. 6, the combining position detecting section 154 identifies the area in which the line i is at the position of 200.

This is the line combining both images; the both images are combined with each other by this portion to reconstruct the whole image.

The image-combining section 155 combines the left-side image and the right-side image using the i-$^{th}$ vertical line, with which the correlation coefficient is the maximum, as the combining line (Step S17).

In other words, the combining section 155 combines the left-side image B and the right-side image B such that the area identified as having the maximum correlation coefficient and the template area overlap with each other.

Figure 7:
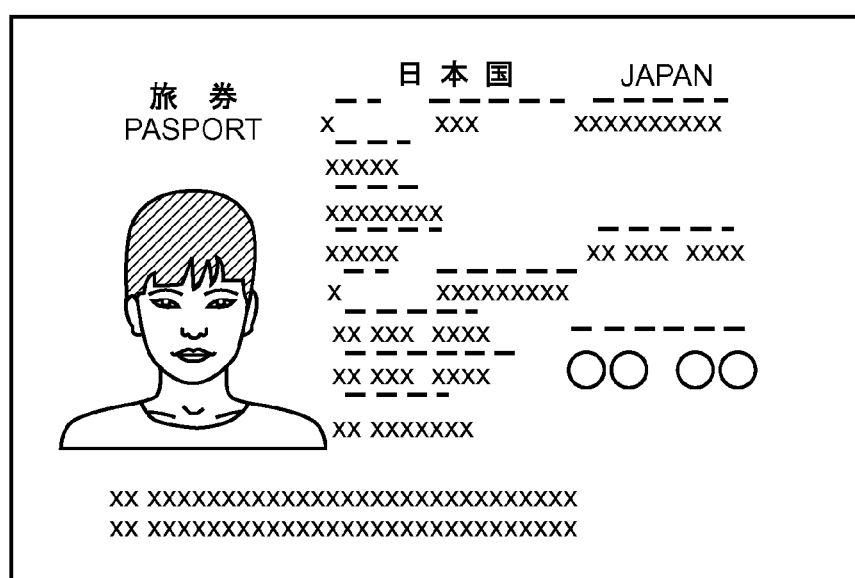
FIG. 7 is a figure showing an example of the image combining result.

FIG. 7 shows an example of the image combining result.

As described, in this embodiment, the image combining position is determined by implementing the correlation operation.

Major Effect of the Embodiment

Since the discrete cosine transform (DCT) operation used in the conventional technique uses a trigonometric function, it generally requires an operation process of high workload; on the other hand, since the DCT operation used in this embodiment does not use a trigonometric function, it requires less workload than the conventional DCT operation.

Therefore, high performance is not required for the operation device, enabling an actual installation at relatively low cost.

Modification Example

The above-described embodiment is merely one example of the embodiment of the present invention, and can be modified in the following manner.

The above-described embodiment and each of the modification examples described below may be combined as necessary.

Modification Example 1

In the above-described embodiment, there are some cases in which the value of the maximum correlation coefficient is relatively small or the peak sharpness is insufficient, depending on the selection of the template area T.

In such a case, the correlation coefficient operating section 152 may modify the horizontal width Tx and/or the vertical width Ty of the template area T, and re-calculate the correlation coefficient using the modified template area T.

Having the condition which gives the largest value from the several different correlation coefficient maximum values acquired by modifying the conditions in the above manner as the optimal condition, the combining position given under this optimal condition may be adopted as the final combining result. Also, the correlation coefficient calculating section 152 may not only modify the horizontal width Tx or the vertical width Ty of the template area T, but also modify the size, the shape or the position of the template area T.

In other words, when the calculation result does not satisfy the predetermined condition, the correlation coefficient calculating section 152 may modify the size, the shape and/or the position of the template area T and implement the calculation operation again using the modified template area T.

Also, the image combining unit 15 may judge whether or not the template area T satisfies the predetermined condition and modify the template area T according to the judgment result.

More specifically described, it may be difficult to implement the overlapping portion detection with the correlation coefficient on the area having a periodic pattern or solid images (such as the entire area with a black image or the entire area with a white image).

Then, for selecting the template area T, the image combining unit 15 detects the projection of the template T, and may modify the shape, the size and/or the position of the template area for an image in which the peak appears periodically (that is, a certain periodic pattern is drawn) or for an image in which the luminance is homogenous over the entire area.

Modification Example 2

In the above embodiment, the template area T is selected from the right-side image B; however, the present invention is not limited to this, but the template area T may be selected from the left-side image A. In this case, the correlation coefficient calculating section 152 selects multiple areas from the right-side image B and calculates a correlation coefficient between each of the selected multiple areas and the template area (selected from the left-side image A).

Also, the correlation coefficient calculating section 152 may implement both the process of selecting a template area from the right-side image B and calculating a correlation coefficient (hereinafter called "the calculation process P1) and the process of selecting a template area from the left-side image A and calculating a correlation coefficient (hereinafter called "the calculation process P2"), then compare the maximum correlation coefficients from both calculations, and adopt the result having the larger correlation coefficient.

Figure 8A:
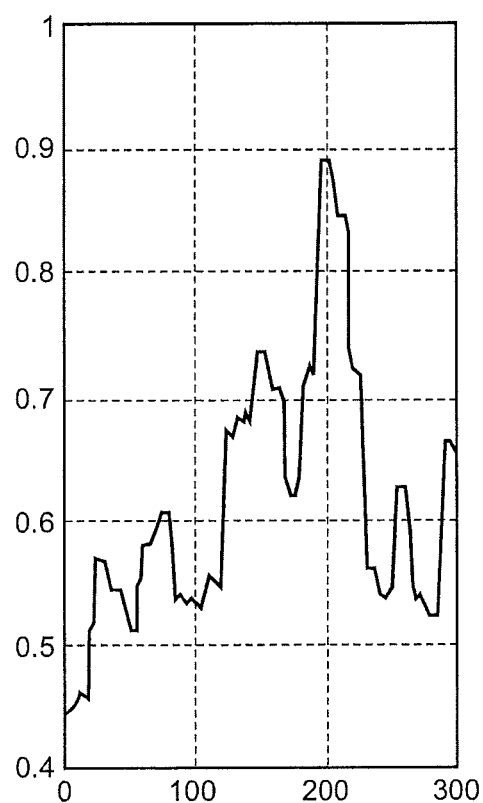
FIGS. 8A and 8B are graphs showing the examples of the calculated correlation coefficients.
Figure 8B:
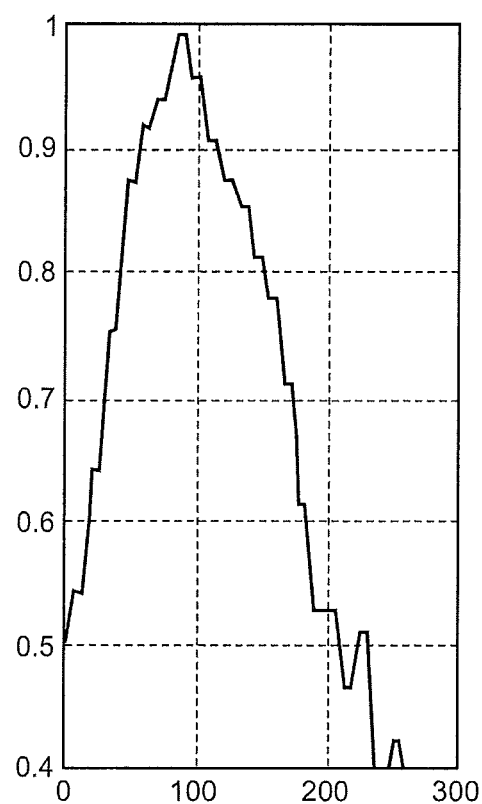

FIG. 8 shows an example of the correlation coefficient calculation result that is obtained in this case.

FIG. 8(*a*) shows the correlation coefficient acquired through the calculation process P1, and FIG. 8(*b*) shows the correlation coefficient acquired through the calculation process P2.

In FIGS. 8(*a*) and (*b*), the horizontal axis indicates the scanning line and the vertical axis indicates the correlation coefficient value. In the examples shown in FIG. 8, the result by (b) has a larger maximum value of the correlation coefficient than the result by (a); therefore, the combining section 155 simply combines the images using the result by (b).

Modification Example 3

In the above-described embodiment, the correlation coefficient calculating section 152, while having the template area T fixed in the right-side image B, calculates the correlation coefficients while shifting the area in the left-side image A by one pixel; however, the unit to shift is not limited to one pixel.

In other words, the unit may be any as long as the correlation coefficient calculating section 152 has fixed the template area in the first image and calculates the correlation coefficients while shifting the area in the second image by a predetermined number of pixel(s).

Modification Example

In the above-described embodiment, a rectangular shape is used for the template area T; however, the shape of the template area is not limited to a rectangular shape, but may be in any shape such as an oval or circle shape.

Also, in the above-described embodiment, the combining position detecting section 154 identifies the area in which the correlation coefficient calculated by the correlation coefficient calculating section 152 is the maximum, from the multiple rectangular areas selected by the correlation coefficient calculating section 152; however, how the area identified is not limited to this.

For example, the combining position detecting section 154 may identify the range of the scanning line i with which the correlation coefficient calculated by the correlation coefficient calculating section 152 is equal to or larger than a predetermined threshold value, and then identify the area corresponding to the center position within the specified range.

Also, as described in the above embodiment referring to FIGS. 8(*a*) and (*b*), for the case in which a template area is set in both the left-side image A and the right-side image B and a correlation coefficient is calculated, the sum of the correlation coefficient values obtained at the $j^{-th}$ pixel on the horizontal axis from the both areas may be acquired and then the areas which give the largest value may be identified as the combining position.

In other words, the area can be identified in any way as long as the combining position detecting section 154 identifies the area in which the correlation coefficient satisfies the predetermined condition among the multiple areas selected by the correlation coefficient calculating section 152.

Modification Example 5

The above-described embodiment uses the image reading unit 16 which has a 1D imaging device and a medium transport mechanism; however, the configuration of the image reading unit is not limited to this, but a reading device which has an area sensor such as a 2D CCD or a CMOS imager and a subject support mechanism may be used.

Modification Example 6

The above embodiment is described using the case in that the image is first read by two partial readings and then the two (partial) images are combined; however, the number of the partial images to combine is not limited to two, but can be more than two.

For example, the image can be read by three partial readings and the three partial images may be combined.

Even in this case, the entire image may be read such that each of the multiple partial images has the overlapping area(s), and a template area is set in the overlapping areas and a correlation coefficient is calculated on each of the areas for the image-combining process in the same manner as the above-described embodiment.

Modification Example 7

The image combining unit 15 of the above-described embodiment may be configured as a hardware such as a DSP or configured as a software such as a computer program stored in the ROM 12 or the hard disk 14, which is read and executed by the CPU 11 of the image combining device 10.

The program stored in the ROM 12 or the hard disk drive 14 in this case can be provided as a program stored in a recording medium that can be read by a computer, such as a magnetic recording medium (a magnetic tape, a magnetic disk drive (HDD), an FD (Flexible Disk), etc.), an optical recording medium (an optical disk), a magneto-optical recording medium or a semiconductor memory.

Also, a program may be downloaded to the image combining device 10 via a communication line such as the internet.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An image combining device for use with a whole image to be read, the image combining device comprising:
    an image reading unit configured to read an image of a first partial area contained in the whole image to be read and an image of a second partial area which has a portion overlapping with a portion of the first partial area;
    a template area setting section configured to set apart an area of a predetermined shape as a comparison area from said overlapping area of said second partial area read by said image reading unit, which overlaps with said first partial area;
    a calculation area setting section configured to select areas of the shape corresponding to the shape of said comparison area from the multiple positions in said first partial area;
    a correlation coefficient calculating section configured to calculate a correlation coefficient between each of the image data values of the multiple areas selected by said calculation area setting section and the image data value of said comparison area;
    an area identifying section configured to identify, from the multiple areas selected by said calculation area setting section, the area in which the calculation result of said correlation coefficient calculating section satisfies a predetermined condition; and
    a combining section configured to combine the image of said first partial area and the image of said second partial area in the positional relationship in which the area identified by said area identifying section and said comparison area overlap with each other.

2. The image combining device as set forth in claim 1 wherein when said calculation result does not satisfy said predetermined condition, said correlation coefficient calculating section modifies the size, the shape and/or the position of said comparison area set apart by said template area setting section and implements said calculation process again using said modified comparison area.

3. The image combining device as set forth in claim 1 wherein said area identifying section identifies the area having the largest value of the correlation coefficient calculated by said correlation coefficient calculating section, from the multiple areas selected by said calculation area setting section.

4. An image combining method implemented by a computer equipped with an image reading unit that reads the image of a first partial area contained in a whole image to be read and the image of a second partial area which has a portion overlapping with a portion of the first partial area, comprising:
    setting an area of a predetermined shape apart as a comparison area from the overlapping area of the second partial area read by said image reading unit which overlaps with said first partial area;
    selecting the areas of the shape corresponding to the shape of said comparison area from the multiple positions in said first partial area;
    calculating a correlation coefficient between each of the image data values of the multiple areas selected by said calculation area setting section and the image data value of said comparison area;
    identifying the area in which the calculation result of said correlation coefficient calculating section satisfies the predetermined condition from the multiple areas selected by said calculation area setting section; and
    combining the image of said first partial area and the image of said second partial area in the positional relationship in which the area identified by said area identifying section and said comparison area overlap with each other.

5. A computer-readable medium having computer-readable instructions that, when executed by a computer equipped with an image reading unit for reading the image of the first partial area in the whole image to be read and the image of the second partial area, cause the computer to perform:
    setting apart an area of a predetermined shape as a comparison area from the overlapping area of the second partial area read by said image reading unit, which overlaps with said first partial area;
    selecting areas of the shape corresponding to the shape of said comparison area from the multiple positions in said first partial area;
    calculating a correlation coefficient between each of the image data values of the multiple areas selected by said selecting and the image data value of said comparison area;
    identifying, from said multiple areas selected by said selecting, the area in which the calculation result of said calculating satisfies a predetermined condition; and
    combining the image of said partial area and the image of said second partial area in the positional relationship in which the area identified by said identifying and said comparison area overlap with each other.

* * * * *